United States Patent Office  
3,509,135  
Patented Apr. 28, 1970

3,509,135  
3-OXYGENATED 4',5 - DIHYDROSPIRO[ESTRA-4,9-DIENE-17,2'(3'H)-FURANS] AND CONGENERS  
Edward A. Brown, Wilmette, Ill., assignor to G. D. Searle & Co., Chicago, Ill., a corporation of Delaware  
No Drawing. Filed July 26, 1968, Ser. No. 747,824  
Int. Cl. A61k 17/06; C07c 173/00  
U.S. Cl. 260—239.55                   2 Claims

ABSTRACT OF THE DISCLOSURE

Preparation of 3-oxygenated 4',5'-dihydrospiro[estra-4,9-diene-17,2'(3'H)-furans], corresponding 9α,10α-epoxides and their anti-DCA, anti-estrogenic, and progestational activity is disclosed.

---

This invention relates to 3-oxygenated 4',5'-dihydrospiro[estra-4,9 - diene - 17,2'(3'H) - furans], corresponding 9α,10α-epoxides, and processes for the preparation thereof. More particularly, this invention provides new, useful, and unobvious chemical compounds of the formula

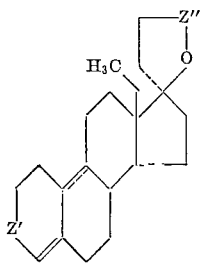

wherein Z' represents carbonyl or β-hydroxymethylene, Z" represents methylene or carbonyl, and the dotted line represents Δ⁹ unsaturation or 9α,10α-epoxy.

The compounds to which this invention relates are useful by reason of their valuable biological properties. For example, they block the effect of desoxycorticosterone acetate (DCA) on urinary sodium and potassium, inhibit the stimulatory effect of estrogens on growth of the uterus, and are progestational.

The biological profile of the instant compounds is the more interesting in that it confirms prior art disclosure that the effects of 9,10-dehydrogenation-and/or epoxidation in steroids are various and unpredictable. Whereas Perelman et al. reported in J. Amer. Chem. Soc., 82, 2402 (1960) that 9,10-dehydrogenation of 17α-alkylated 19-nortestosterone markedly enhanced anti-estrogenic activity but had little effect otherwise, Fried et al. showed the next year in the same journal (83, 4663) that 9,10-dehydrogenation of 17α-ethynylated 19-nortestosterone increased both anti-gonadotrophic and oral progestational activity. The instant 9,10-dehydro compounds manifest anti-estrogenic activity ranging from almost the same as to considerably *less* than that of the corresponding saturated compounds; and although their oral progestational activity—if any—has not been evaluated, their subcutaneous progestational activity appears equal to or less than that of the saturated analogs. Farkas et al. observed in J. Med. Chem., 9, 510 (1966) that 9α,10α-epoxidation obliterated (at doses at least as high as 3 mg. total) the oral anabolic activity known by those skilled in the art to inhere in 17α-methyl-19-nortestosterone, and caused a 90% drop in the progestational activity of 17α-ethynyl-19-nortestosterone. On the other hand, the subcutaneous progestational activity of the instant 9,10-epoxy compounds appears to be about the same as that of the corresponding dihydro compounds, and the anti-DCA activity which characterizes both the epoxy and the Δ⁹ compounds of the invention has been observed only in 4',5'-dihydrospiro[estr-4-ene-17,2'(3'H)-furan]-3,3'-dione among prior art 9,10-dihydro analogs.

Tests for anti-DCA activity can be carried out substantially as described in S.N. 647,600 filed June 21, 1967, now U.S. Patent No. 3,412,094, subcutaneous administration of test compounds being substituted for oral administration if desired, and potency relative to the well-known anti-DCA substance spironolactone calculated by varying the test compound dosage sufficiently to enable determination of that dose of each compound (the so-called median effective dose) which produces a mean log Na×10/K value identical to that produced by 0.33 mg. of spironolactone, then dividing 0.33 by the median effective dose of test compound and multiplying by 100. Results of such tests on representative compounds of the instant invention are tabulated below.

TABLE I

| Compound: | Ex. | Pot., percent |
|---|---|---|
| 9α,10α-epoxy-4',5'-dihydrospiro[estr-4-ene-17,2'(3'H)-furan]-3-one | 3 | 83 |
| 4',5'-dihydrospiro[estra-4,9-diene-17,2'(3'H)-furan]-3,3'-dione | 4 | 83 |
| 4'-5'-dihydro-3β-hydroxyspiro[estra-4,9-diene-17,2'(3'H)-furan]-3'-one | 5 | 22 |
| 9α,10α-epoxy-4',5'-dihydrospiro[estr-4-ene-17,2'(3'H)-furan]-3'3'-dione | 6 | 41 |

Various prior art compounds, when treated by the foregoing procedure, afforded results set forth in Table II.

TABLE II

| Compound | Pot., percent |
|---|---|
| 4',5'-dihydrospiro[estr-4-ene-17,2'(3'H)-furan]-3-one | <37 |
| 4',5'-dihydrospiro[estr-4-ene-17,2'(3'H)-furan]-3,3'-dione | 378 |
| 4',5'-dihydro-3β-hydroxyspiro[estr-4-ene-17,2'(3'H)-furan]-3'-one | <14 |

Compounds shown to have potencies *less* than specified values *may or may not* have any anti-DCA activity.

Tests for anti-estrogenic acitvity can be carried out as described by Edgren et al. in Proc. Soc. Exp. Biol. Med., 94, 537 (1957). Results of such tests on representative compounds of the instant invention are set forth in Table III, potencies being relative to progesterone.

TABLE III

| Compound: | Ex. | Pot., percent |
|---|---|---|
| 4',5'-dihydrospiro[estra-4,9-diene-17,2'(3'H)-furan]-3-one | 1 | 450 |
| 4',5'-dihydrospiro[estra-4,9-diene-17,2'(3'H)-furan]-3β-ol | 2 | 480 |
| 4',5'-dihydrospiro[estra-4,9-diene-17,2'(3'H)-furan]-3,3'-dione | 4 | 210 |

Prior art compounds, when subjected to the foregoing antiestrogen test procedure, afforded results set forth in Table IV.

TABLE IV

| Compound | Pot., percent |
|---|---|
| 4',5'-dihydrospiro[estr - 4 - ene - 17,2'(3'H)-furan]-3-one | 10,000 |
| 4',5'-dihydrospiro[estr - 4 - ene - 17,2'(3'H)-furan]-3β-ol | 1000 |
| 4',5'-dihydrospiro[estr - 4 - ene - 17,2'(3'H)-furan]-3,3'-dione | 6500 |

Tests for progestational activity can be carried out as described by Claudberg in C. Zentr. Gynakol., 54, 2757 (1930), modified as follows: Immature, female rabbits weighing about 1 kg. and primed with 17β-estradiol by subcutaneously injecting 5 mcgm. thereof per animal on each of 6 successive days are used in this test. To each of a group of 3-4 such animals, beginning the next day after the last priming injection, test compound dissolved or suspended in corn oil is administered subcutaneously or buccally on each of 5 successive days. Commonly the initial daily dosage is 1 mg. of compound in 0.1 ml. of corn oil administered subcutaneously. Other animals likewise administered corn oil alone serve as controls. On the 6th day after the last priming injection, the animals are sacrificed; and a segment of each uterus is taken for histological examination whereby the degree of arborization of the endometrial glands is graded in accordance with a method similar to that described by McPhail in J. Physiol., 83, 145 (1934). A +1 response represents the effect of estrogen priming alone and is indicated by the absence of glandular proliferation. A +2 response is defined as that induced in the estrogen-primed animals by 0.05 mg. of progesterone administered subcutaneously, and is considered to represent minimal progestational activity. Responses in the range +3 to +4 reflect potent progestational effects typical of those produced by 0.1 mg. of subcutaneous progesterone. If the average rating for the test animals is less than +2 at the 1 mg. dose level, the compound is considered inactive. If the average rating at this dose is greater than +2, the test is repeated with compound administered in progressively lesser amounts until the dose required to produce an average rating of precisely +2 can be determined. Potency of the compound, relative to progesterone, is then calculated by dividing this dose into 0.05 and multiplying by 100. Results of such tests on representative compounds of the instant invention are set forth in Table V.

TABLE V

| Compound | Ex. | Pot., percent |
| --- | --- | --- |
| 4',5'-dihydrospiro[estr-4,9-diene-17,2'(3'H)-furan]-3-one | 1 | 1,000 SC |
| 4',5'-dihydrospiro[estra-4,9-diene-17,2'(3'H)-furan]-3,3'-dione | 4 | ≧500 SC |

Prior art compounds, when subjected to the foregoing progestational test procedure, afforded results set forth in Table VI.

TABLE VI

| Compound | Pot., percent SC |
| --- | --- |
| 4',5'-dihydrospiro[estr - 4 - ene - 17,2'(3'H)-furan]-3-one | 1000 |
| 4',5'-dihydrospiro[estr - 4 - ene - 17,2'(3'H)-furan]-3,3'-dione | ≧500 |

Preparation of the 3-oxo-$\Delta^{4,9}$ compounds of this invention proceeds by heating an appropriate 3-oxo-$\Delta^{5(10)}$ compound of the formula

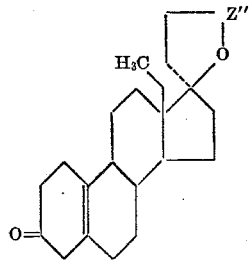

wherein Z'' is defined as before, with pyridinium bromide perbromide in pyridine. The resultant diene is converted to the 9α,10α-epoxy-3-oxo-$\Delta^4$ compound by contacting with m-chloroperbenzoic acid in chloroform solution. The 3β-ols of the invention are prepared from the corresponding 3-ones by contacting with lithium hydrotri-tert.-butoxy-aluminate in tetrahydrofuran.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

4',5'-dihydrospiro[estra-4,9-diene-17,2'(3'H)-furan]-3-one

To a solution of 289 parts of 4',5'-dihydrospiro[estr-5(10)-ene-17,2'(3'H)-furan]-3-one in 1800 parts of pyridine under nitrogen is added, with stirring during 3 minutes, 346 parts of pyridinium bromide perbromide. Heat is evolved. When the heat effect subsides, the reaction mixture is brought up to a temperature of 100° over 45 minutes and then allowed to cool for 15 minutes, at which point the mixture is poured into 20,000 parts of ice-water. The precipitate which forms is filtered off, washed with water, dried in air, and recrystallized from ethyl acetate to give 4',5'-dihydrospiro[estr - 4,9 - diene-17,2'(3'H)-furan]-3-one melting at 131–133°. The product has the formula

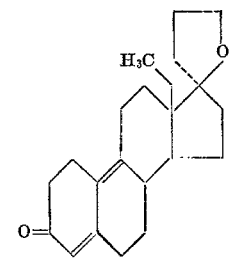

EXAMPLE 2

4',5'-dihydrospiro[estra-4,9-diene-17,2'(3'H)furan]-3β-ol

A mixture of 2 parts of 4',5'-dihydrospiro[estra-4,9-diene-17,2'(3'H)-furan]-3-one and 4 parts of lithium hydrotri-tert.-butoxyaluminate in 180 parts of tetrahydrofuran is stirred at room temperatures for 20 hours and then poured into an ice-cold mixture of 37 parts of glacial acetic acid with 1500 parts of water. The precipitate which forms is filtered off, washed with water, dried in air, and recrystallized from ethyl acetate to give 4',5' - dihydrospiro[estra - 4,9-diene-17,2'(3'H)-furan]-3β-ol melting at 140–144°. The product has the formula

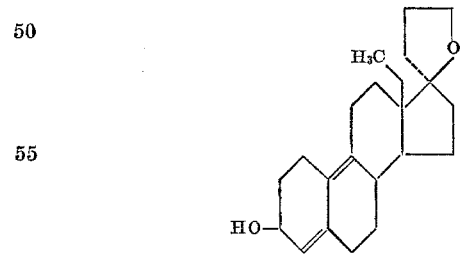

EXAMPLE 3

9α,10α-epoxy-4',5'-dihydrospiro[estr-4-ene-17,2'(3'H)-furan]-3-one

To a solution of 200 parts of 4',5'-dihydrospiro[estra-4,9-diene-17,2'(3'H)-furan]-3-one in 2250 parts of chloroform is added 172 parts of m-chloroperbenzoic acid. The resultant mixture is allowed to stand at room temperature for approximately 3 hours, whereupon insoluble solids are filtered off and washed with 675 parts of chloroform. Filtrate and wash are combined and mixed with 5000 parts of aqueous 5% potassium iodide and 5 parts of concentrated hydrochloric acid. Sufficient sodium thiosulfate is introduced to decolorize the mixture, whereupon the lower layer is separated and mixed with a dichloromethane extract of the upper layer. The material thus obtained is successively washed with aqueous 2% potassium carbonate and saturated aqueous sodium chloride, dried over anhydrous sodium sulfate, and stripped of solvent by vacuum distillation under nitrogen. The residue is crystallized from ethyl acetate to give 9α,10α-epoxy - 4′,5′-dihydrospiro[estr-4-ene-17,2′-(3′H)-furan]-3-one melting at approximately 135–136°. The product has the formula

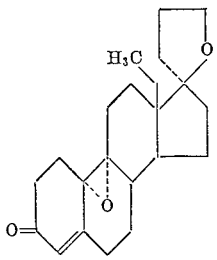

EXAMPLE 4

4′,5′-dihydrospiro[estra-4,9-diene-17,2′(3′H)-furan]-3,3′-dione

To a solution of 108 parts of 4′,5′-dihydrospiro[estr-5(10)-ene-17,2′(3′H)-furan]-3,3′-dione in 600 parts of pyridine under nitrogen is added, with agitation during approximately 10 minutes, 125 parts of pyridinium bromide perbromide, followed by an additional 300 parts of pyridine. When the heat effect subsides (typically after about 10 minutes), the reaction mixture is heated to 101° over 50 minutes, then cooled to 50° and thereupon poured into 8000 parts of ice-water. The precipitate which forms is filtered off, washed with water, dried in air, and recrystallized from ethyl acetate to give 4′,5′-dihydrospiro[estra-4,9-diene-17,2′(3′H)-furan]-3,3′-dione melting at 153–157°. The product has the formula

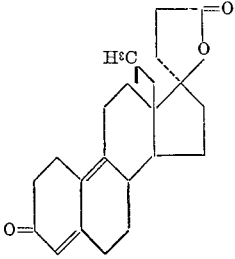

EXAMPLE 5

3β-hydroxy-4′,5′-dihydrospiro[estra-4,9-diene-17,2′(3′H)-furan]-3′-one

A mixture of 2 parts of 4′,5′-dihydrospiro[estra-4,9-diene-17,2′(3′H)-furan]-3,3′-dione and 4 parts of lithium hydrotri-tert.-butoxyaluminate in 180 parts of tetrahydrofuran is stirred at room temperatures for 18 hours and then poured into an ice-cold mixture of 37 parts of glacial acetic acid with 1500 parts of water. The precipitate which forms is isolated by filtration, washed with water, dried in air, and recrystallized from ethyl acetate to give 3β - hydroxy - 4′,5′ - dihydrospiro[estra-4,9-diene-17,2′(3′H)-furan]-3′-one melting at 138–142°. The product has the formula

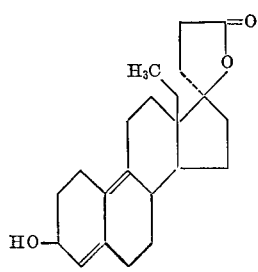

EXAMPLE 6

9α,10α-epoxy-4′,5′-dihydrospiro[estr-4-ene-17,2′(3′H)-furan]3,3′-dione

To a solution of 100 parts of 4′,5′-dihydrospiro[estra-4,9-diene-17,2′(3′H)-furan]-3,3′-dione in 1050 parts of chloroform is added 86 parts of m-chloroperbenzoic acid. Approximately 1½ hours later, insoluble solids are filtered off and washed with ½ volume of chloroform. Filtrate and wash are combined and mixed with 2500 parts of aqueous 5% potassium iodide and 5 parts of concentrated hydrochloric acid. The mixture is decolorized with sodium thiosulfate, whereupon the lower layer is separated and combined with a dichloromethane extract of the upper layer. The material thus obtained is successively washed with aqueous 2% potassium carbonate and saturated aqueous sodium chloride, dried over anhydrous sodium sulfate, and stripped of solvent by vacuum distillation under nitrogen. The residue is slurried with hot ethyl acetate, then recrystallized from acetone to give 9α,10α-epoxy-4′,5′-dihydrospiro[estr-4-ene-17,2′-furan]-3,3′-dione melting at 222–227°. The product has the formula

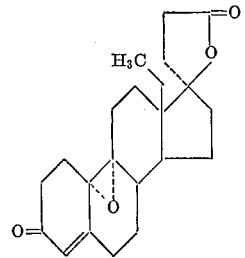

What is claimed is:
1. A compound having the formula

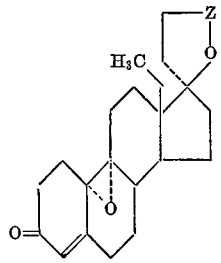

wherein Z represents methylene or carbonyl.

2. A compound according to claim 1 which is 9α,10α-epoxy - 4′,5′ - dihydrospiro[estr - 4 - ene - 17,2′(3′H)-furan]-3-one.

References Cited

UNITED STATES PATENTS

| | | | |
|---|---|---|---|
| 3,238,197 | 3/1966 | Arth | 260—239.55 |
| 3,297,686 | 1/1967 | Brown | 260—239.55 |
| 3,423,404 | 1/1969 | Klimstra | 260—239.55 |

LEWIS GOTTS, Primary Examiner

E. G. LOVE, Assistant Examiner

U.S. Cl. X.R.

260—239.57; 424—241

PO-1050
(5/64)

UNITED STATES PATENT OFFICE
CERTIFICATE OF CORRECTION

Patent No. 3,509,135　　　　　　　　Dated　April 28, 1970

Inventor(s)　　Edward A. Brown

It is certified that error appears in the above-identified patent and that said Letters Patent are hereby corrected as shown below:

Column 1, in the title, "4',5-" should be -- 4',5'- --; and in the formula

"  " should be -- --.

Column 2, Table I, line 1, "9α.10α" should be -- 9α,10α --; and Table I, the last line, "3'3'-" should be -- 3,3'- --.

Column 3, in the formula; Column 4, in both formulas; and Column 5, the first formula " 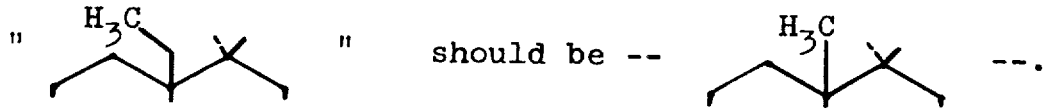 " should be -- --.

Column 5, the second formula,

" 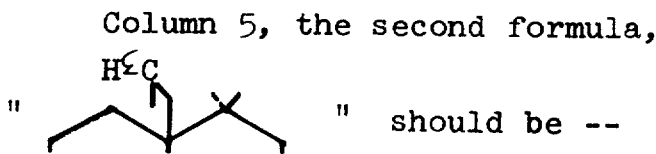 " should be -- --.

Column 5, the last formula, and Column 6, both formulas

" 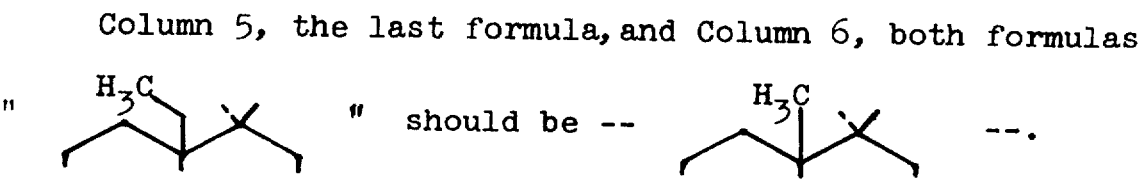 " should be -- --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents